United States Patent
Chang

(10) Patent No.: US 9,563,074 B2
(45) Date of Patent: Feb. 7, 2017

(54) BACKLIGHT MODULE

(71) Applicant: HON HAI PRECISION INDUSTRY CO., LTD., New Taipei (TW)

(72) Inventor: Shao-Han Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 244 days.

(21) Appl. No.: 14/509,420

(22) Filed: Oct. 8, 2014

(65) Prior Publication Data

US 2015/0146413 A1    May 28, 2015

(30) Foreign Application Priority Data

Nov. 28, 2013  (CN) .......................... 2013 1 0615359

(51) Int. Cl.
*G02F 1/13*      (2006.01)
*G02F 1/1335*    (2006.01)

(52) U.S. Cl.
CPC ....... *G02F 1/1306* (2013.01); *G02F 1/133603* (2013.01); *G02F 1/133605* (2013.01); *G02F 2001/133607* (2013.01)

(58) Field of Classification Search
CPC .............. G02F 1/1306; G02F 1/133605; G02F 2011/133607; G02F 2201/34; G02F 2203/02; G02F 1/133606; G02F 1/133608; F21V 7/005; G09F 13/06; G09F 13/12; G09F 13/14; G09F 2013/14; G09F 2013/142; G09F 2013/145; G09F 2013/147

USPC ........................................................ 362/97.3
See application file for complete search history.

(56) References Cited

U.S. PATENT DOCUMENTS

| | | | | |
|---|---|---|---|---|
| 6,667,779 B2* | 12/2003 | Lee | .................. | G02F 1/133308 349/58 |
| 8,911,133 B2* | 12/2014 | Sato | ..................... | G02B 6/0061 362/607 |
| 2007/0210694 A1* | 9/2007 | Kim | .................. | G02F 1/133608 313/493 |
| 2011/0222267 A1* | 9/2011 | Park | .................. | G02F 1/133615 362/97.1 |
| 2013/0094242 A1* | 4/2013 | Yang | ..................... | G02F 1/1336 362/602 |

FOREIGN PATENT DOCUMENTS

| | | |
|---|---|---|
| CN | 2613785 Y | 4/2004 |
| CN | 101191860 A | 6/2008 |
| CN | 103411167 A | 11/2013 |
| TW | 200943148 A | 10/2009 |

* cited by examiner

*Primary Examiner* — Laura Tso
*Assistant Examiner* — Naomi M Wolford
(74) *Attorney, Agent, or Firm* — Zhigang Ma

(57) ABSTRACT

A backlight module includes a back cover, a light source panel positioned on the back cover, a frame connected with the back cover and an optical film assembled to the frame. A pair of reflective plates are positioned between the frame and the back cover, and a plurality of through holes are defined on the pair of reflective plates. A chamber is cooperatively defined between the pair of reflective plates and the back cover, and inner surfaces of the chamber have a high reflectivity.

9 Claims, 5 Drawing Sheets

BACKLIGHT MODULE

FIELD

The subject matter herein generally relates to backlight modules, and particularly, to a direct type backlight module.

BACKGROUND

Along with progress of modern video technology, a liquid crystal display apparatus (LCD) has been applied in cell phones, laptops, personal computers (PC), personal digital assistants (PDA), and other consumer electronic products. A backlight module is required to illuminate the LCD panel.

BRIEF DESCRIPTION OF THE DRAWINGS

Implementations of the present technology will now be described, by way of example only, with reference to the attached figures.

DETAILED DESCRIPTION

Figure 1:
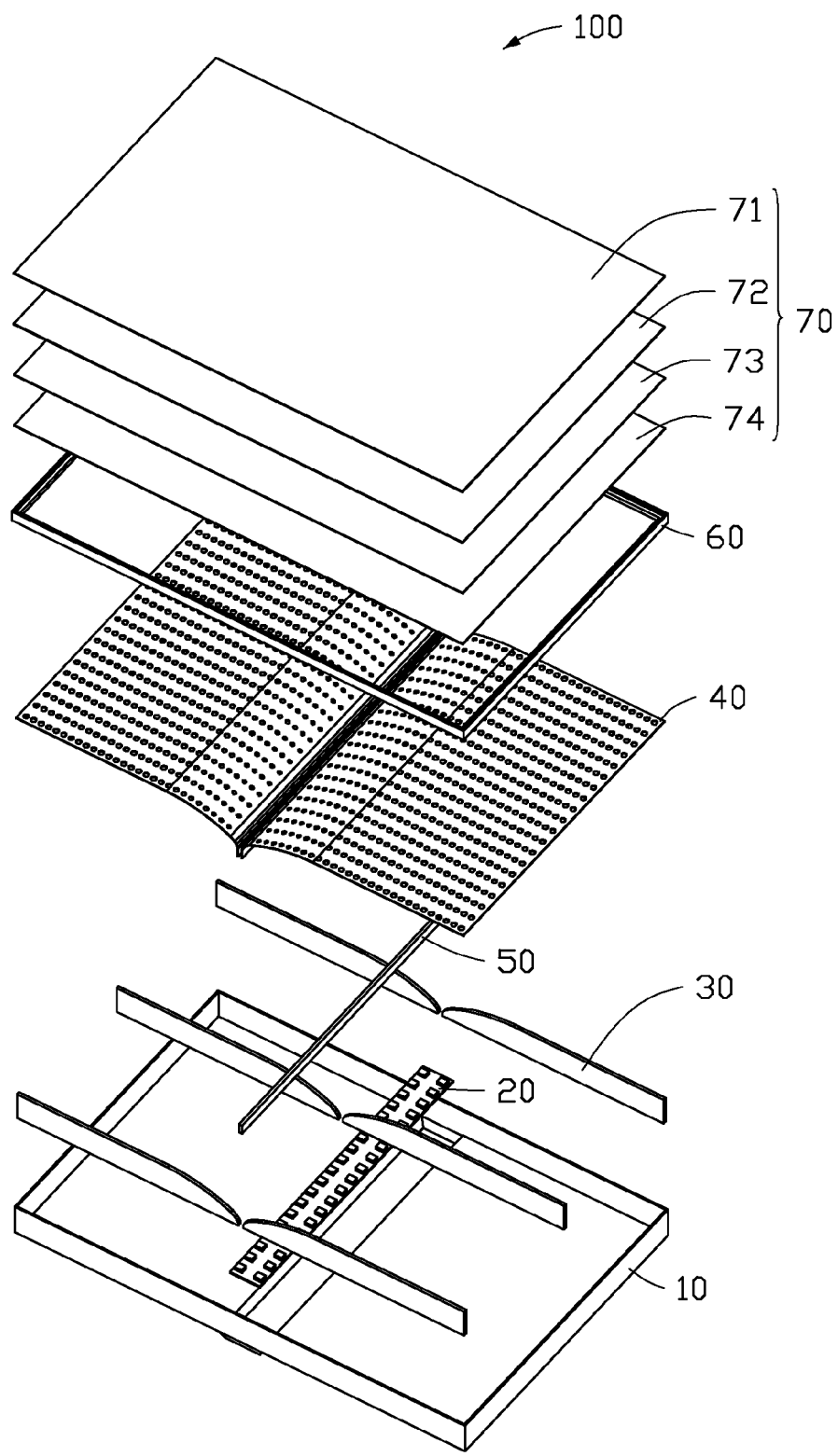
FIG. 1 is an exploded, perspective view of an embodiment of a backlight module.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to a direct type backlight module.

FIG. 1 illustrates an embodiment of a backlight module 100. The backlight module 100 can include a substantially box-shaped back cover 10, a light source panel 20 received in the back cover 10, a plurality of support ledges 30 received in the back cover 10, a pair of reflective plates 40 assembled on the support ledge 30, a fastening ledge 50 configured to fasten the reflective plates 40, a frame 60 connected to an upper end of the back cover 10, and an optical film 70 assembled on the frame 60.

The optical film 70 can include a number of complementary optical elements arranged in order. In the illustrated embodiment, the optical film 70 can include a first diffusion sheet 71, a first prism lens 72, a second prism lens 73, and a second diffusion sheet 74.

Figure 2:
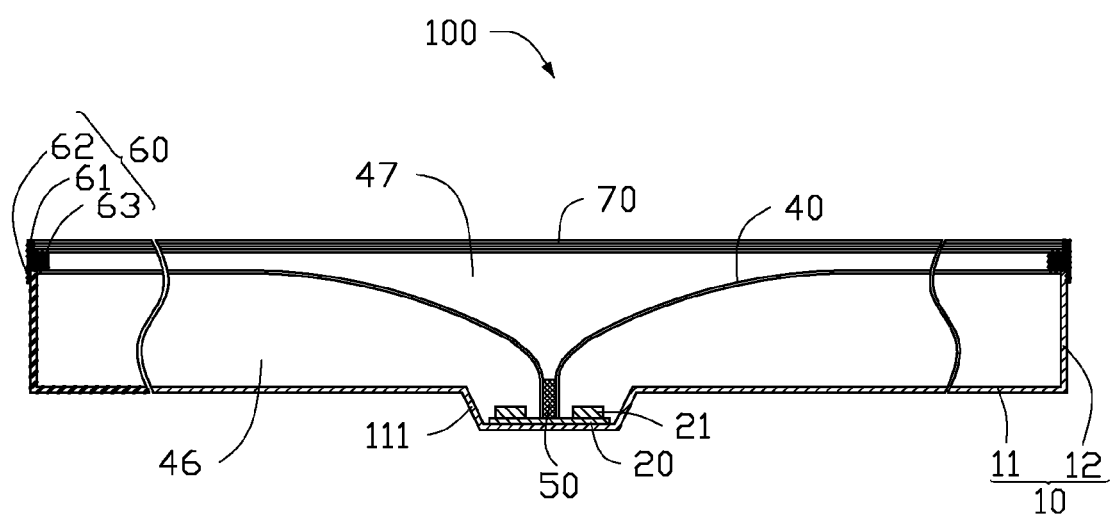
FIG. 2 is a cross-sectional view of the backlight module of FIG. 1.

FIG. 2 illustrates that the back cover 10 can include a bottom plate 11 and four sidewalls 12 perpendicular to the bottom plate 11. Inner surfaces of the bottom plate 11 and the four sidewalls 12 can be covered by a layer having a reflectivity of about 0.9 or greater. The layer can be made of silver or other materials, such as printed ink. In other embodiments, the number of sidewalls 12 can be three or more than four.

The back cover 10 can include a recess 111 defined on the center of the bottom plate 11, the recess 111 can match the light source panel 20, and the light source panel 20 can be received in the recess 111. The cross section of the recess 111 can be trapezoidal. In other embodiments, the cross section of the recess 111 can be rectangular or other shapes.

The light source panel 20 can be a substantially rectangular plate and attached on the bottom of the recess 111. The light source panel 20 can define a plurality of light sources 21. The plurality of light sources 21 can be light emitting diodes (LEDs). In the illustrated embodiment, the plurality of light sources 21 can be uniformly arranged in paratactic two-row type, and each of the pair of reflective plates 40 can match a row of light source 21. In other embodiments, the plurality of light sources 21 can be arranged in other types.

A chamber 46 can be cooperatively defined by the back cover 10 and the reflective plate 40. Inner surfaces of the chamber 46 can be highly reflective. The light emitted from the light sources 21 can be mixed substantially in the chamber 46 before transmission, so the chamber 46 can replace the conventional light guide plate. Moreover, the chamber 46 can be small, whereby the backlight module 100 can be thin and light.

The frame 60 can be hollow and substantially rectangular and can be integrally formed by plastic. The frame 60 can include an upper frame 61, a lower frame 62, and a protrusion 63 positioned between the upper frame 61 and the lower frame 62. The protrusion 63 can be assembled on the top of sidewalls 12 of the back cover 10. The upper frame 61 and the protrusion 63 can cooperatively define a receiving portion (not labeled) configured to receive the optical film 70.

The lower frame 62 can be connected to the sidewalls 12 of the back cover 10. The lower frame 62 and the protrusion 63 can cooperatively fasten edges of the reflective plate 40. In other embodiments, the frame 60 can be other shapes, which are configured to receive the optical film 70 and fasten the reflective plate 40.

The optical film 70 can be assembled on the protrusion 63, and the reflective plate 40 positioned below the protrusion 63. Thus, a light mixing space 47 can be defined between the optical film 70 and the reflective plate 40. A distance between the optical film 70 and the reflective plate 40 can be defined as D. The distance D can be pre-determined according to actual requirements. To make a uniform luminance of the light emitted from the backlight module 100, the distance D can be equal to or larger than 0.2 millimeter (mm).

Figure 3:
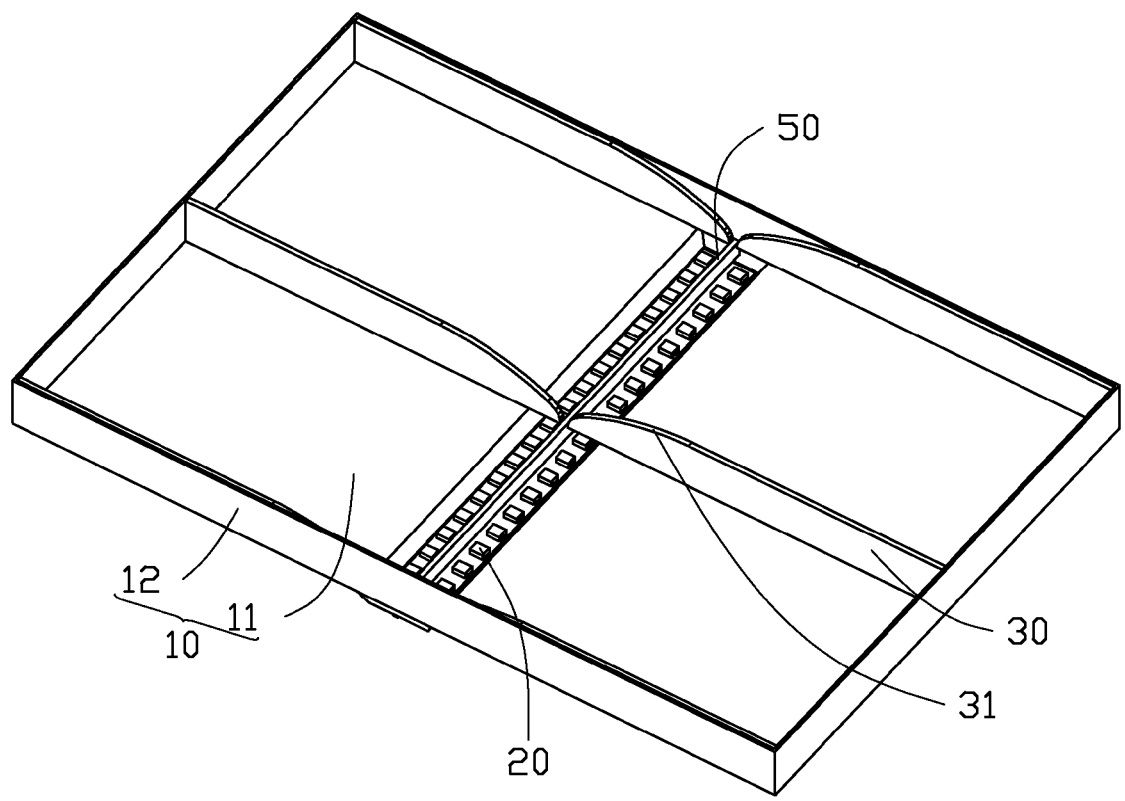
FIG. 3 is a partial and enlarged view of the backlight module of the FIG. 1.

FIG. 3 illustrates that each of the plurality of support ledges 30 can be substantially a plate, and the plurality of support ledges 30 can be equally distributed in an array around the recess 111 (shown in FIG. 2). The plurality of support ledges 30 can support the reflective plates 40 (shown in FIG. 2), therefore the plurality of support ledges 30 can prevent deformation of the reflective plates 40. Each of the plurality of support ledges 30 can include a bend portion 31 adjacent to the recess 111, and the height of the support ledges 30 can decrease as the distance between the support ledges 30 and the recess 111 decreases. In the illustrated embodiment, the plurality of support ledges 30 can be symmetrically arranged on the bottom plate 11 in two rows, and each of the plurality of support ledges 30 can be perpendicular to the recess 111.

The fastening ledge 50 can be a plate parallel to the light source panel 20, and can be sandwiched between the two rows of light sources 21 (shown in FIG. 2). Meanwhile, the pair of reflective plates 40 (shown in FIG. 2) can be connected to the fastening ledge 50.

Figure 4:
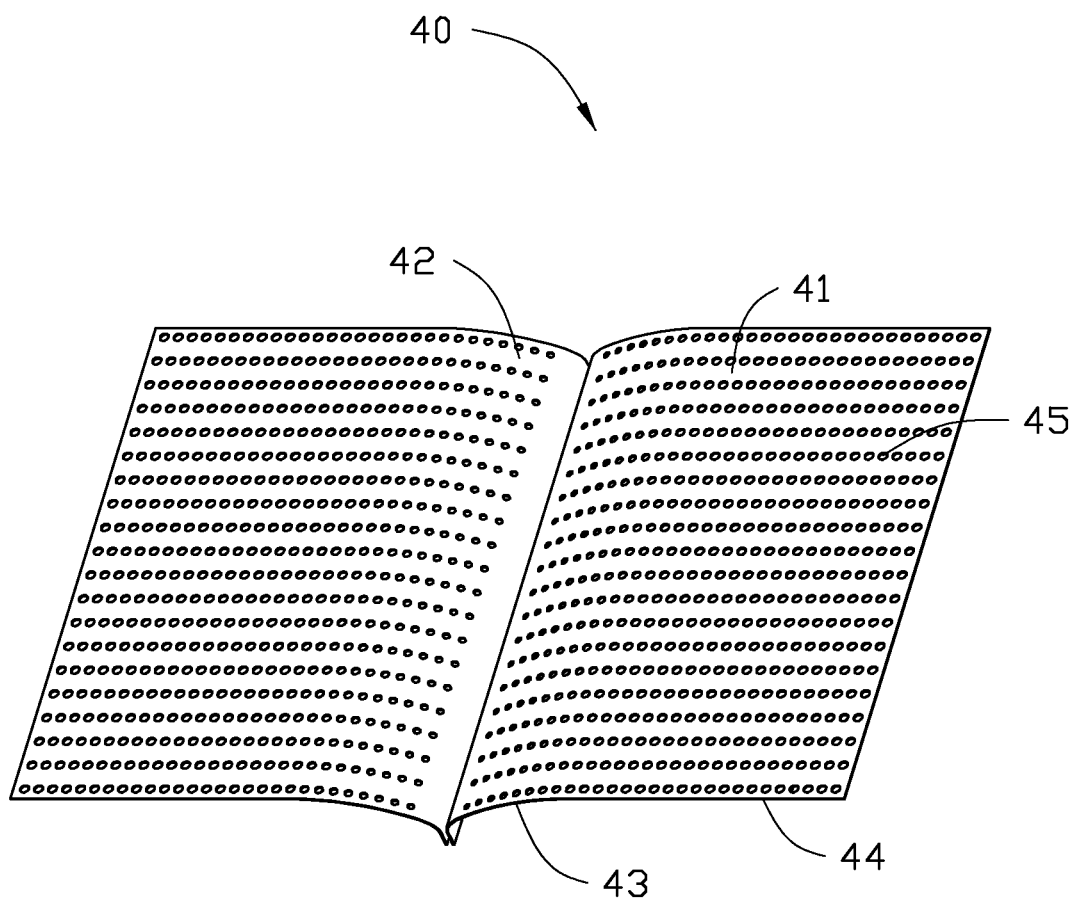
FIG. 4 is a perspective view of the reflective plate of the backlight module of FIG. 1.

FIG. 4 is a perspective view of the reflective plate of the backlight module of FIG. 1. The pair of reflective plates 40 can include a first reflective plate 41 and a second reflective plate 42. The first reflective plate 41 and the second reflective plate 42 can be respectively positioned at two sides of the light source panel 20. The first reflective plate 41 and the second reflective plate 42 can include a curved surface 43 near the light source panel 20. The curved surface 43 can match the bend portion 31 of the number of support ledges 30. The curved surface 43 can extend perpendicularly from the sidewalls 12 to the light source panel 20, and connect to the light source panel 20. In the illustrated embodiment, the pair of reflective plates 40 can also include a plane surface 44 opposite to the curved surface 43. The plane surface 44 can be parallel to the bottom plate 11 of the back cover 10 (shown in FIG. 3).

The reflective plate 40 can define a plurality of through holes 45. The plurality of through holes 45 are evenly distributed, and a light transmitting through the plurality of through holes 45 can have a high density. Each of the plurality of through holes 45 can be circular, rectangular, or other shapes. The plurality of through holes 45 can be uniformly distributed in an array. The surfaces of the pair of reflective plates 40 adjacent to the back cover 10 can be attached with a highly reflective layer (not shown). The highly reflective layer can be a silver membrane or other materials, such as a printed ink layer.

In other embodiments, the plurality of through holes 45 can match the category of the optical film 20. If the diffusion sheet is abnormal, the plurality of through holes 45 can be bar-shaped.

In other embodiments, the diameter of each of the plurality of through holes 45 can be larger as the distance between the plurality of through holes 45 and the light source panel 20 increases. Meanwhile, the diameter of the plurality of through holes 45 can be unchanged, and the distribution density of the plurality of through holes 45 can be greater as the distance between the plurality of through holes 45 and the light source panel 20 increases.

In assembly, the light source panel 20 can be positioned within the recess 111 of the back cover 10. The plurality of support ledges 30 can be attached to the bottom plate 11 of the back cover 10, and the fastening ledge 50 can be positioned between the two rows of light sources 21. Then, the first reflective plate 41 and the second reflective plate 42 can be symmetrically positioned on the number of support ledges 30 and can be connected with the fastening ledge 50. The frame 60 can cover the sidewalls 12 of the back cover 10, the lower frame 62 and the protrusion 63 can cooperatively fasten the end of the pair of reflective plates 40.

Finally, the first diffusion sheet 71, the first prism film 72, the second prism film 73, and the second diffusion sheet 74 can be stacked together in order, and the optical film 70 can be positioned on the receiving portion defined by the upper frame 61 and the protrusion 63.

Figure 5:
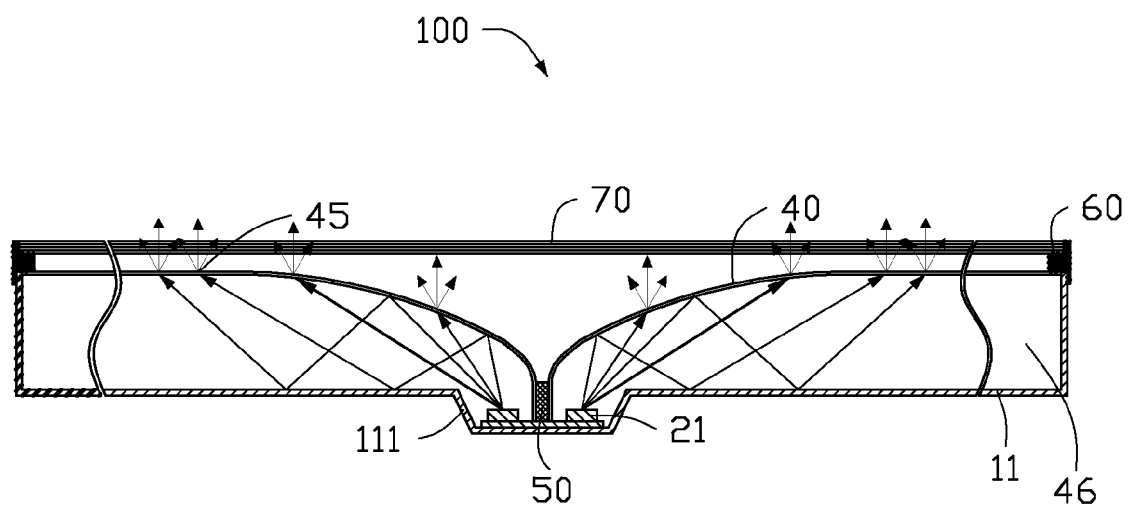
FIG. 5 is a diagrammatic view of light distribution of the backlight module of FIG. 1.

FIG. 5 illustrates a light distribution graph of the backlight module 100 of FIG. 1. In use, the light sources 21 can illuminate, the light can be transmitted into the chamber 46. A part of the light can be transmitted through the plurality of through holes 45, the remainder of the light can be reflected in the chamber 46 multiple times, and then transmitted out through the plurality of through holes 45. The light transmitted through the plurality of through holes 45 can be small beams of light with high density. Then, the light can be mixed in the light mixing space 47, thereby the light incident to the optical film 70 can be more uniform.

The light guide plate of the conventional backlight module can be replaced with the chamber 46, and the application efficiency of the light can be high in the backlight module 100, the backlight module 100 can be lighter. The present disclosure can realize a light design of a liquid crystal display device. The distance between the optical film 70 and the pair of reflective plates 40 can make a luminance of the light emitted from the plurality of through holes 45 uniform. The backlight module 100 can also realize both the luminance uniformity and a thin design of a liquid crystal display device.

The embodiments shown and described above are only examples. Many details are often found in the art such as the other features of a backlight module. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A backlight module comprising:
   a back cover;
   a light source panel received in the back cover;
   a frame connected to the back cover; and
   an optical film coupled to the frame;
   a pair of reflective plates positioned between the back cover and the frame; and
   a fastening ledge connected to the pair of reflective plates; and
   wherein a plurality of through holes are defined on the pair of reflective plates, and the pair of reflective plates and the back cover cooperatively define a chamber; and
   wherein inner surfaces of the chamber have a high reflectivity.

2. The backlight module of claim 1, wherein each of the pair of reflective plates comprises a curved surface adjacent to the light source panel, and a plane surface parallel to the back cover.

3. The backlight module of claim 1, wherein a plurality of support ledges is positioned between the pair of reflective plates and the back cover, and the pair of reflective plates are supported by the support ledges.

4. The backlight module of claim 1, wherein the frame comprises an upper frame, a lower frame, and a protrusion positioned between the upper frame and the lower frame, wherein the protrusion is located around the interior surface of the frame, and wherein the upper frame and the protrusion cooperatively define a receiving portion configured to receive the optical film.

5. The backlight module of claim 4, wherein the optical film is assembled on the protrusion, the two reflective plates are positioned below the protrusion, and a light mixing space is defined between the optical film and the pair of reflective plates.

6. The backlight module of claim 4, wherein the back cover comprises a bottom plate and a plurality of sidewalls perpendicular to the bottom plate, and the plurality of sidewalls are connected with the lower frame.

7. The backlight module of claim 6, wherein the back cover includes a recess defined on the bottom plate, wherein the cross section of the recess is rectangular, and the light source panel is received in the recess.

8. The backlight module of claim 7, wherein the light source panel has at least one light source, wherein the at least one light source is a light emitting diode.

9. The backlight module of claim 1, wherein the optical film comprises a first diffusion sheet, a first prism lens, a second prism lens, and a second diffusion sheet arranged and stacked in order, wherein a top of the stack begins with the first diffusion sheet and a bottom of the stack ends with the second diffusion sheet.

* * * * *